(12) United States Patent
Harada et al.

(10) Patent No.: US 12,172,390 B2
(45) Date of Patent: Dec. 24, 2024

(54) FRP MOLDING SYSTEM AND METHOD

(71) Applicant: IHI Aerospace Co., Ltd., Tokyo (JP)

(72) Inventors: Takashi Harada, Tokyo (JP); Yu Shigenari, Tokyo (JP); Toyoharu Akimoto, Tokyo (JP); Ikuo Okumura, Tokyo (JP); Shinichi Tanaka, Tokyo (JP)

(73) Assignee: IHI Aerospace Co., Ltd., Tokyo (JP)

( * ) Notice: Subject to any disclaimer, the term of this patent is extended or adjusted under 35 U.S.C. 154(b) by 130 days.

(21) Appl. No.: 17/910,399

(22) PCT Filed: Aug. 31, 2020

(86) PCT No.: PCT/JP2020/032887
§ 371 (c)(1),
(2) Date: Sep. 9, 2022

(87) PCT Pub. No.: WO2022/044324
PCT Pub. Date: Mar. 3, 2022

(65) Prior Publication Data
US 2023/0123571 A1    Apr. 20, 2023

(51) Int. Cl.
*B29C 70/34*    (2006.01)
*B29C 43/14*    (2006.01)
(Continued)

(52) U.S. Cl.
CPC .......... *B29C 70/345* (2013.01); *B29C 43/146* (2013.01); *B29C 43/34* (2013.01);
(Continued)

(58) Field of Classification Search
CPC ..... B29C 70/46; B29C 70/461; B29C 70/462; B29C 33/02; B29C 33/42;
(Continued)

(56) References Cited

U.S. PATENT DOCUMENTS 1,394,558 A * 10/1921 Klug .................... B29D 99/006
                                                      147/48
1,676,325 A *  7/1928 Doll ...................... B29C 33/485
                                                      425/403
(Continued)

FOREIGN PATENT DOCUMENTS

JP    2008-222221 A    9/2008
JP    2015-009396 A    1/2015
(Continued)

OTHER PUBLICATIONS

International Preliminary Report on Patentability issued on Feb. 28, 2023 for PCT International Application No. PCT/JP2020/032887.
(Continued)

*Primary Examiner* — Matthew J Daniels
(74) *Attorney, Agent, or Firm* — Volpe Koenig

(57) ABSTRACT

An FRP material has a circular arc part, and a member fixed to the circular arc part. The FRP forming system has a portion-pressing device, a member positioning mechanism, and a transport device configured to form the FRP material as a single body of a circular arc-shaped FRP part. The FRP material may comprise a single layer prepreg or a plurality of prepregs that have been layered. The portion-pressing device has upper and lower molds sandwiching a portion of the FRP material in a radial direction orthogonal to the circular arc part, and compresses intermittently a portion of the FRP part. The member positioning mechanism locates the position of the member relatively to the upper or lower mold. The transport device moves the portion of the FRP material that is compressed by the portion-pressing device. The portion-pressing and the transport are repeated to form the FRP part.

11 Claims, 8 Drawing Sheets

(51) Int. Cl.
*B29C 43/34* (2006.01)
*B29C 70/46* (2006.01)
*B29K 105/08* (2006.01)

(52) U.S. Cl.
CPC ............ *B29C 2043/3411* (2013.01); *B29K 2105/0872* (2013.01)

(58) Field of Classification Search
CPC .......... B29C 2043/3205; B29C 43/361; B29C 2043/3615; B29C 33/50; B29C 33/485; B29C 33/48
See application file for complete search history.

(56) References Cited

U.S. PATENT DOCUMENTS

| | | | | |
|---|---|---|---|---|
| 2,682,924 | A * | 7/1954 | Maquat | B29C 33/485 279/2.16 |
| 3,752,438 | A * | 8/1973 | Baillie | F16L 43/007 285/179 |
| 3,896,206 | A * | 7/1975 | Beaver | B29C 70/462 264/258 |
| 4,908,090 | A * | 3/1990 | Kozachevsky | B29C 33/76 425/35 |
| 4,946,526 | A * | 8/1990 | Petty-Galis | B29D 99/0014 156/196 |
| 5,350,139 | A * | 9/1994 | Leyderman | B29D 23/001 249/177 |
| 9,023,265 | B1 * | 5/2015 | Rotter | B29C 70/30 264/258 |
| 10,232,532 | B1 | 3/2019 | Prebil et al. | |
| 2008/0230652 | A1 | 9/2008 | Bjornstad et al. | |
| 2008/0246175 | A1 | 10/2008 | Bjornstad et al. | |
| 2012/0073738 | A1 * | 3/2012 | Crothers | B29C 70/38 156/391 |
| 2013/0020030 | A1 * | 1/2013 | Lonsdorfer | B29C 33/485 156/196 |
| 2015/0083860 | A1 * | 3/2015 | Frauen | B64C 1/26 244/119 |
| 2015/0158281 | A1 | 6/2015 | Aijima et al. | |
| 2016/0136879 | A1 * | 5/2016 | Matsen | B29C 65/5057 219/634 |
| 2017/0355152 | A1 * | 12/2017 | Joern | B64F 5/10 |
| 2020/0078990 | A1 | 3/2020 | Sana | |
| 2022/0009178 | A1 * | 1/2022 | Harada | B29C 70/461 |

FOREIGN PATENT DOCUMENTS

WO 2018/101422 A1 6/2018
WO WO-2020183545 A1 * 9/2020 ............ B29C 33/20

OTHER PUBLICATIONS

International Search Report, PCT/JP2020/032887, Oct. 20, 2020, 2 pgs.
Extended European Search Report issued on Sep. 22, 2023 for European Patent Application No. 20951573.3.
Canadian Examiner's Report issued on Dec. 20, 2023 for Canadian Patent Application No. 3172428.

* cited by examiner

FRP MOLDING SYSTEM AND METHOD

FIELD OF INVENTION

The present invention relates especially to an FRP molding system and method for molding a large circular arc-shaped FRP component.

BACKGROUND ART

Fiber-reinforced composite materials, such as CFRP (carbon fiber reinforced plastic), have superior mechanical properties, higher specific strength, lighter weight, and more robust characteristics, while having a lower density than metal materials such as iron and aluminum.

Therefore, in recent years, fiber-reinforced composite materials have been used in aircraft, small vessels, automobiles, and the like as structural members that replace aluminum alloys. Hereinafter, a fiber-reinforced composite material will be referred to simply as "FRP."

For example, aircraft structures (fuselage, hatches, wings, and the like) have conventionally joined aluminum alloys together by riveting. However, joining with rivets has poor workability, and when applied to a fiber-reinforced composite material, internal fibers are cut, thus causing the tensile strength to be extremely deteriorated.

Therefore, it is conceivable, for example, to manufacture large FRP molded products using the means described in Patent Literature 1.

According to "Manufacturing method for FRP molded products," described in Patent Literature 1, a sheet-like FRP material containing a thermoplastic resin and reinforcing fibers is placed on a surface mat so as to overlap each other, and heated by using a heating device. After that, the FRP material still placed on the surface mat is conveyed and set in the mold of a press machine. Then, using the press machine, the overlapping FRP material and the surface mat are pressed to manufacture an FRP molded product in which the reinforcing fibers and the surface mat are integrated with the thermoplastic resin.

CITATION LIST

Patent Literature

PTL 1: Japanese Patent Publication Laid-open No. 2015-009396

SUMMARY OF INVENTION

Technical Problem

The following problems are found in the above-mentioned Patent Literature 1 in the case where a large FRP component (a circular arc-shaped FRP component having a radius of 1 m or more) such as an aircraft fuselage is molded.
(1) A large mold and a large press machine capable of pressing large FRP components are required.
(2) To mold a circular arc-shaped FRP component, pressing in a radial direction orthogonal to the circular arc of the FRP component is required to ensure uniformity of the molded product.

In this case, however, a mold adapted to press in the radial direction with respect to the circular arc of the FRP component inevitably has a complicated structure.

In addition, conventionally, skins (circular arc portions) and members (e.g., stringers) were molded individually and then joined in a post-process. This complicated the manufacturing process.

The present invention has been made to solve the problems described above. Specifically, an object of the present invention is to provide FRP molding system and method capable of uniformly molding an entire circular arc-shaped FRP component with a member (e.g., a large FRP component) by applying pressure in the radial direction to the circular arc without using a large or complicated mold.

Solution to Problem

The present invention provides an FRP molding system for manufacturing a circular arc-shaped FRP component by integrally molding an FRP material having a circular arc part of a circular arc shape and a member fixed to the circular arc part, the FRP molding system including:
  a portion-pressing device which has an upper mold and a lower mold sandwiching a portion of the FRP material in a radial direction orthogonal to the circular arc part, and which intermittently compresses the portion to partially mold the FRP component;
  a member positioning mechanism which positions the member with respect to the upper mold or the lower mold; and
  a transport device which intermittently moves a portion of the FRP material compressed by the portion-pressing device.

Further, the present invention provides an FRP molding method for manufacturing a circular arc-shaped FRP component by integrally molding an FRP material having a circular arc part of a circular arc shape and a member fixed to the circular arc part, the FRP molding method including:
  a member positioning step of positioning the member with respect to an upper mold or a lower mold;
  a portion-pressing step of sandwiching a portion of the FRP material by the upper mold and the lower mold in a radial direction orthogonal to the circular arc part, and intermittently compressing the portion to partially integrally mold the FRP component; and
  a transport step of intermittently moving a compressed portion of the FRP material obtained by the portion-pressing step,
  wherein the portion-pressing step and the transport step are repeated.

Advantageous Effects of Invention

According to the present invention, a member is positioned with respect to an upper mold or a lower mold in a member positioning step, and a portion of an FRP material is sandwiched by the upper mold and the lower mold in a radial direction orthogonal to the circular arc part, and the portion is intermittently compressed (pressed) to mold an FRP component partially integrally in a portion-pressing step. Further, in the transport step, the compressed portion of the FRP material is intermittently moved. Thus, a circular arc-shaped FRP component (e.g., a large FRP component) having a member can be molded and manufactured by a small mold by repeating the member positioning step, the portion-pressing step, and the transport step.

Further, in the portion-pressing step, a portion of an FRP material is compressed (pressed) by the upper mold and the lower mold in the radial direction orthogonal to the circular arc part of the FRP component, so that an entire FRP component having a member can be uniformly molded without using a complicated mold.

DESCRIPTION OF EMBODIMENTS

Figure 1A:
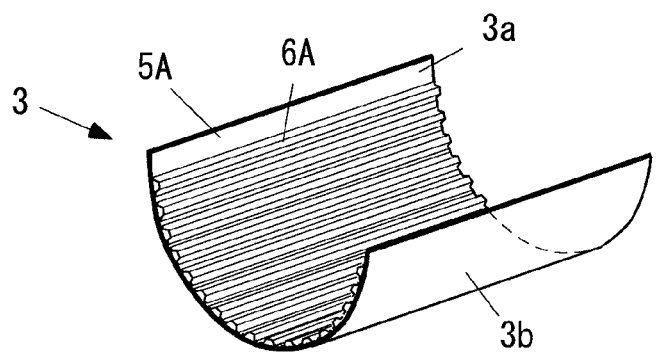
FIG. 1A is a typical perspective view of an FRP component manufactured by the present invention.

The following will describe in detail an embodiment of the present invention with reference to the accompanying drawings. Throughout the drawings, constituent elements commonly shown in the drawings will be assigned the same reference numerals, and duplicate explanations thereof will be omitted.

Figure 1B:
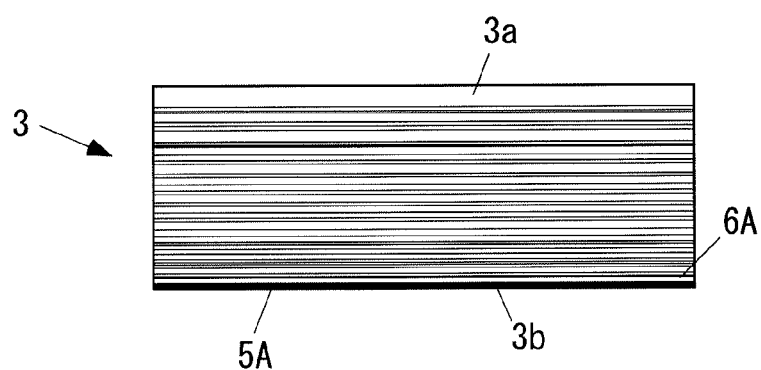
FIG. 1B is a side sectional view of the FRP component.
Figure 1C:
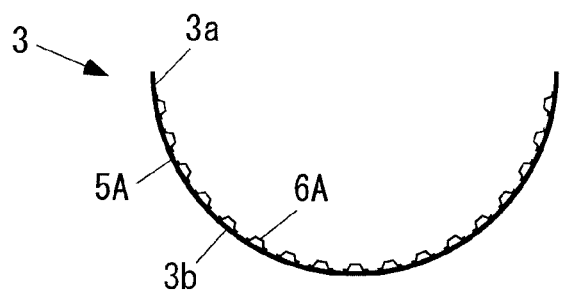
FIG. 1C is an end view of the FRP component.

FIG. 1A to FIG. 1C are explanatory diagrams of an FRP component 3 to be manufactured by the present invention.

The FRP component 3 to be manufactured by the present invention is the circular arc-shaped FRP component 3 having a radius of 1 m or more. In the drawings, FIG. 1A is a typical perspective view of the FRP component 3, FIG. 1B is a side sectional view thereof, and FIG. 1C is an end view thereof.

The term "the circular arc-shaped FRP component 3 having a radius of 1 m or more" means a large FRP component such as an aircraft fuselage. The radius is, for example, 2 m, or may be 1 m to 10 m. The axial length (the length in an axial direction) is, for example, 8 m, but may be 10 cm to 20 m.

The term "circular arc-shaped" means, for example, a circular arc having an invariable radius as illustrated in FIG. 1A, but the radius may partly or continuously change rather than being exactly invariable. The circumferential angle (arc angle) of the circular arc is preferably 180 degrees or less, but may exceed 180 degrees insofar as the angle does not cause interference with a press frame 24, which will be described later.

Further, the FRP component 3 in this example has a circular arc part 5A having a circular arc shape and a member 6 fixed to the circular arc part 5A.

The member 6 in this example represents a plurality of stringers 6A that are fixed to the circular arc part 5A and extend in parallel to each other in the axial direction. The member 6 may be fixed to the inner surface or the outer surface of the circular arc part 5A.

Further, the member 6 is not limited to the stringers 6A, and may be a different member such as a channel having an L-shaped cross section.

The term "axial direction" is not limited to an exact axial direction, but may be inclined with respect to the axial direction.

Further, the thickness of the circular arc part 5A in the radial direction is preferably invariable, but may partly or continuously change. For example, the window frames and the door sections of an aircraft fuselage may be included.

An FRP molding system 100 of the present invention uses an outer surface jig plate 12.

Figure 2A:
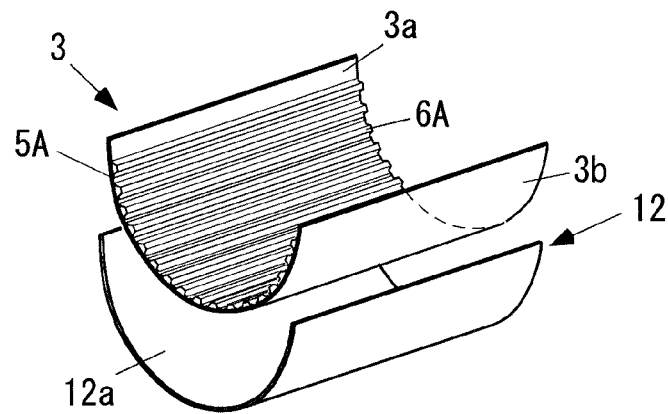
FIG. 2A is a typical perspective view of an outer surface jig plate.
Figure 2B:
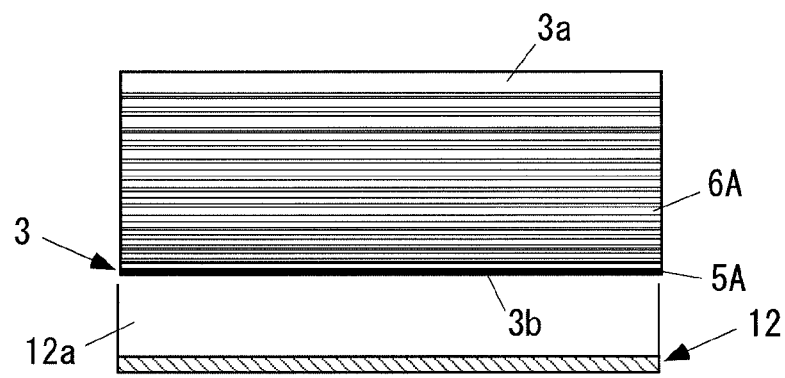
FIG. 2B is a side sectional view of the outer surface jig plate.
Figure 2C:
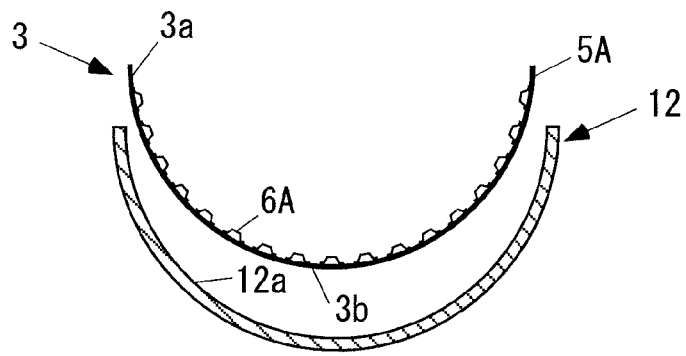
FIG. 2C is an end view of the outer surface jig plate.

FIG. 2A to FIG. 2C are explanatory diagrams of the outer surface jig plate 12. For example, FIG. 2A is a typical perspective view of the outer surface jig plate 12, FIG. 2B is a side sectional view thereof, and FIG. 2C is an end view thereof.

The outer surface jig plate 12 is a circular arc-shaped member made of a metal or a highly heat-resistant resin (e.g., polyimide), and has a property of not being plastically deformed while the FRP component 3 is being formed. The outer surface jig plate 12 may be elastically deformed at the time of molding the FRP component 3.

As illustrated in FIG. 2A, the outer surface jig plate 12 has an inner surface 12a fitted to an outer surface shape 3b of the FRP component 3.

The term "fitted to" means a relationship in which a male shape and a female shape are in close contact with each other with no gap formed therebetween.

Further, the outer surface jig plate 12 has a surface shape that accommodates a change in the plate thickness or a change in the curvature of the FRP component 3 between the outer surface jig plate 12 and the FRP component 3.

The FRP molding system 100 of the present invention is an apparatus adapted to manufacture the circular arc-shaped FRP component 3, which has a radius of 1 m or more, by molding the FRP material 2.

The FRP material 2 is composed of a prepreg 1 having a single layer or a plurality of prepregs 1 that are layered.

The term "prepreg 1" is an intermediate material obtained by impregnating a base material made of reinforcing fibers (e.g., glass fibers or carbon fibers) with a resin. In the present invention, the resin is preferably a thermoplastic resin, but may alternatively be a thermosetting resin.

A resin before molding is solid in a thermoplastic resin and soft (uncured) in a thermosetting resin.

The FRP molding system 100 of the present invention uses an integrated member in which the FRP material 2 is held on the inner surface 12a of the outer surface jig plate 12 (hereinafter referred to as an "integrated jig plate 14").

Figure 3A:
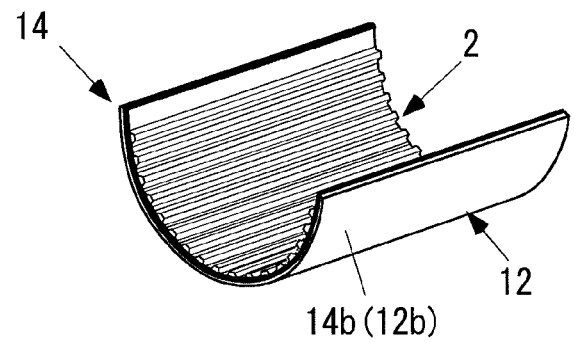
FIG. 3A is a typical perspective view of an integrated jig plate having an FRP material held on the inner surface of the outer surface jig plate of FIG. 2A.
Figure 3B:
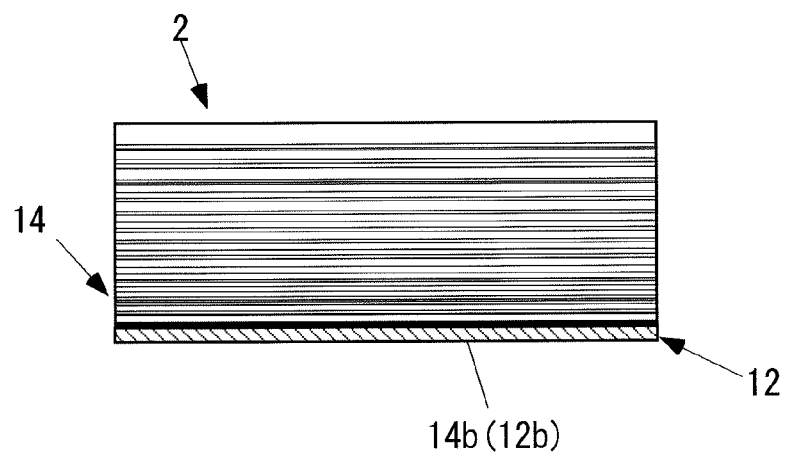
FIG. 3B is a side sectional view of the integrated jig plate.
Figure 3C:
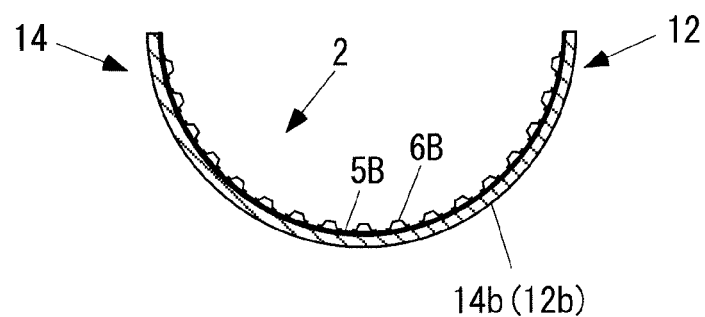
FIG. 3C is an end view of the integrated jig plate.

FIG. 3A to FIG. 3C are explanatory diagrams of the integrated jig plate 14. In these drawings, the inner surface 12a of the outer surface jig plate 12 has the FRP material 2 held at the position of the FRP component 3 in FIG. 2A to FIG. 2C.

The means for holding the FRP material 2 is, for example, by temporarily attaching the FRP material 2 by the adhesive force of the resin itself of the FRP material 2. Alternatively, the outer edge of the outer surface jig plate 12 may be provided with a mechanism for holding the outer edge of the FRP material 2.

FIG. 3A is a typical perspective view of the integrated jig plate 14 with the FRP material 2 held on the inner surface 12a of the outer surface jig plate 12 in FIG. 2A, FIG. 3B is a side sectional view of the integrated jig plate 14, and FIG. 3C is an end view of the integrated jig plate 14.

The FRP material 2 is held on the inner surface 12a of the outer surface jig plate 12 in such a manner as not to be separated from the outer surface jig plate 12.

The "FRP material 2" is a material on which a plurality of prepregs 1 are to be layered and which turns into an FRP component 3 after molding.

As with the FRP component 3, the FRP material 2 has a circular arc part 5B having a circular arc shape and a plurality of stringers 6B which are held on the inner surface of the circular arc part 5B and which extend in parallel to each other in the axial direction.

The circular arc part 5B and the stringers 6B are preferably plate-shaped members.

Figure 4:
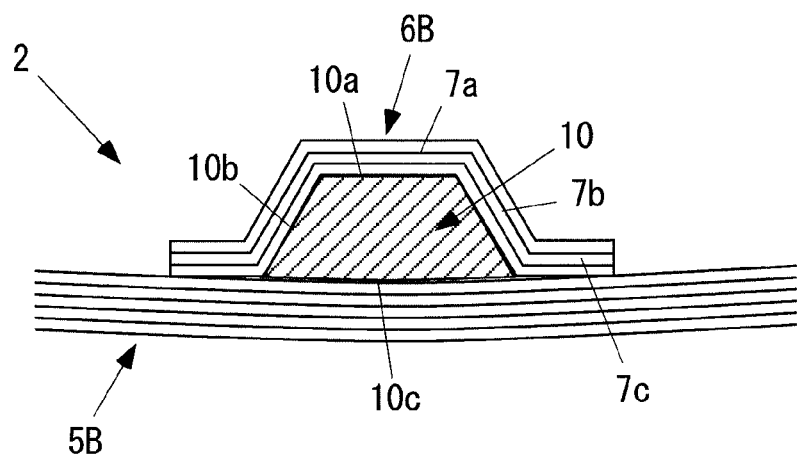
FIG. 4 is a partial enlarged view of FIG. 3C.

FIG. 4 is a partial enlarged view of FIG. 3C. In this drawing, the outer surface jig plate 12 is not illustrated.

As illustrated in this drawing, the circular arc part 5B of the FRP material 2 is a laminate that matches the plate thickness distribution of the circular arc part 5A of the FRP component 3. The circular arc part 5B is preferably composed of a laminate that matches the circular arc molding shape.

Further, the stringer 6B of the FRP material 2 is a laminate, a molded product, or a preformed product that has been bent to match the cross-sectional shape of the stringer 6A of the FRP component 3.

The thickness of the circular arc part 5B of the FRP material 2 corresponds to the thickness in the radial direction of the circular arc part 5A of the FRP component 3, and is set by taking into account a thickness change during molding. Further, the number of layers of the prepregs 1 is preferably changed according to a thickness change in the FRP component 3.

The width of the FRP material 2 corresponds to the circumferential length of the circular arc of the FRP component 3. The length of the FRP material 2 corresponds to the axial length of the FRP component 3.

The same applies also to the stringers 6B of the FRP material 2.

In FIG. 4, the stringer 6B has a detachable mandrel 10 sandwiched between the stringer 6B and the circular arc part 5B, and both ends thereof in the circumferential direction are held on the inner surface of the circular arc part 5B.

The mandrel 10 preferably has a trapezoidal cross-sectional shape, and has an upper surface 10a, slope surfaces 10b, and a bottom surface 10c. The bottom surface 10c is desirably a circular arc surface that matches the inner surface of the circular arc part 5B.

Further, the mandrel 10 desirably has an integrated structure having a draft angle with respect to the stringers 6B or a split structure. The term "the integrated structure" means a structure that does not take the split structure.

In FIG. 4, the stringer 6B has an upper surface part 7a that is in close contact with the upper surface 10a of the trapezoid of the mandrel 10, a pair of side surface parts 7b that are in close contact with the slope surfaces 10b of the trapezoid, and a pair of leg parts 7c that extend outward from the lower ends of the side surface parts 7b and are in close contact with the inner surface of the circular arc part 5B.

The pair of leg parts 7c are held on the inner surface of the circular arc part 5B. The pair of leg parts 7c are held by, for example, temporary attachment by the adhesive force of the resin itself of the leg parts 7c.

The sectional shapes of the stringers 6A and 6B are not limited to a trapezoid, and may be a different shape, such as a triangle or a dome shape having a circular arc-shaped top part, insofar as the shape does not interfere with an upper mold 16, which will be described later.

Similarly, the mandrel 10 may have a shape which is other than the trapezoid and which matches the cross-sectional shapes of the stringers 6A and 6B.

Figure 5A:
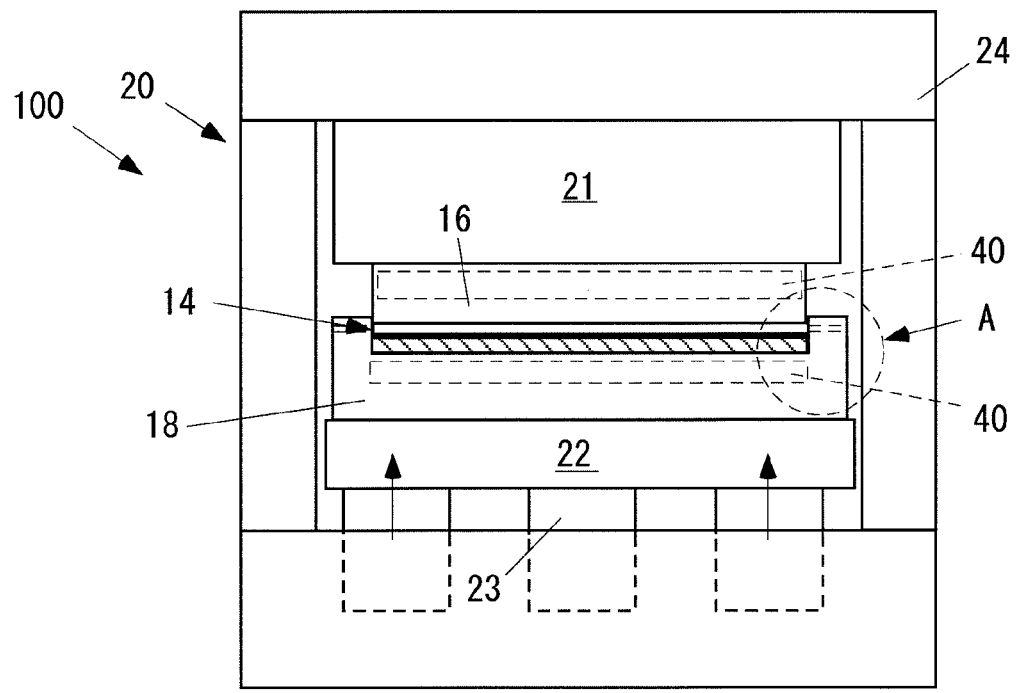
FIG. 5A is a front view of an FRP molding system in accordance with the present invention.
Figure 5B:
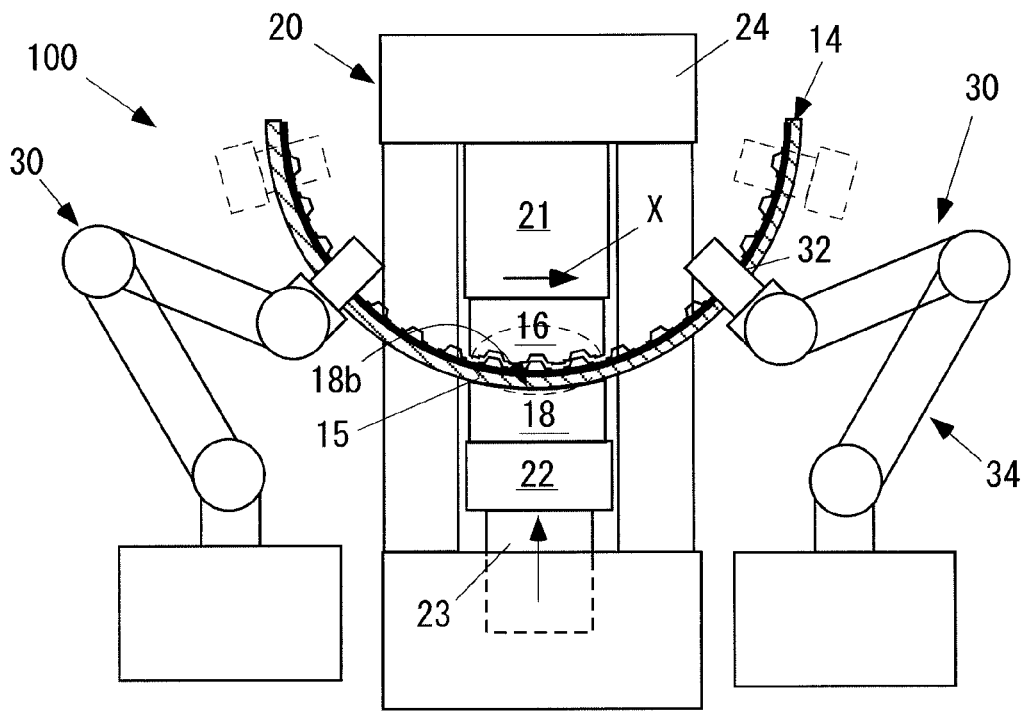
FIG. 5B is a side view of FIG. 5A.

FIG. 5A is a front view of the FRP molding system 100 according to the present invention, and FIG. 5B is a side view thereof. FIG. 5B illustrates molding in progress.

In FIG. 5A and FIG. 5B, the FRP molding system 100 further includes the upper mold 16 and a lower mold 18.

The upper mold 16 and the lower mold 18 sandwich a portion of the integrated jig plate 14 (a press portion 15) in the vertical direction.

Figure 6:
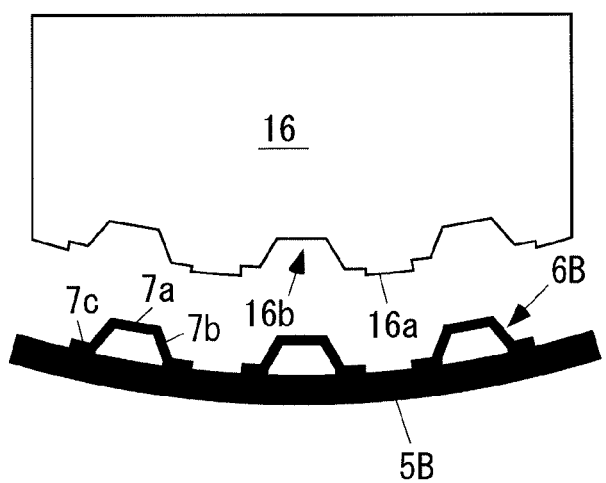
FIG. 6 is an enlarged view of an upper mold in FIG. 5B.

FIG. 6 is an enlarged view of the upper mold 16 of FIG. 5B.

As illustrated in this drawing, the upper mold 16 has lower surface circular arc surfaces 16a to come in close contact with the circular arc parts 5A and 5B, and lower surface recessed grooves 16b fitted to the upper surface shapes of the stringers 6A and 6B.

The lower surface recessed grooves 16b of the upper mold 16 are configured to be fitted to the upper surface parts 7a, the side surface parts 7b, and the leg parts 7c of the stringer 6B.

In this drawing, the three lower surface recessed grooves 16b are provided in the lower surface of the upper mold 16, but the present invention is not limited to three insofar as there is one or more.

Further, the shapes of the plurality of the lower surface recessed grooves 16b may not be completely the same.

In FIG. 5A and FIG. 5B, the lower mold 18 has an upper surface circular arc surface 18b that comes in close contact with an outer surface 14b of the integrated jig plate 14.

In other words, in this example, the integrated jig plate 14 includes the outer surface jig plate 12, and the upper surface circular arc surface 18b comes in close contact with the outer surface 12b of the outer surface jig plate 12.

Further, in this example, the upper mold 16 and the lower mold 18 simultaneously compress the entirety of the axial length (the length in the axial direction) of the integrated jig plate 14.

In FIG. 5A and FIG. 5B, the FRP molding system 100 further includes a portion-pressing device 20, a member positioning mechanism 26, and a transport device 30.

The portion-pressing device 20 intermittently compresses a portion (the press portion 15) of the integrated jig plate 14 in the radial direction (the vertical direction in the drawing) orthogonal to the circular arc part 5B of the FRP material 2 to partially form the FRP component 3.

The term "intermittently compresses" means to repeat the compression and the transport of the integrated jig plate 14 by the portion-pressing device 20 and the transport device 30.

The portion-pressing device 20 compresses a portion of the integrated jig plate 14 by the upper mold 16 and the lower mold 18.

In this example, the portion-pressing device 20 has an upper bolster 21 that fixes the upper mold 16 to the lower surface, a slide 22 that fixes the lower mold 18 to the upper surface, a hydraulic ram 23 that reciprocates the slide 22 up and down, and a press frame 24 to which the upper bolster 21 and the hydraulic ram 23 are fixed.

In this example, the portion-pressing device 20 pushes the lower mold 18 up to the upper mold 16 so as to compress the press portion 15 of the integrated jig plate 14. In this case, the portion-pressing device 20 compresses the press portion 15 in the diameter direction of a lower surface circular arc surface 16a or the upper surface circular arc surface 18b.

The upper structure of the press frame 24 is set not to interfere with the integrated jig plate 14 when intermittently moving a compressed portion of the integrated jig plate 14.

The vertical relationship between the bolster and the slide 22 and the hydraulic ram 23 may be reversed insofar as the integrated jig plate 14 and the press upper structure do not interfere with each other. More specifically, the slide 22 and the hydraulic ram 23 may be on the upper side and the bolster may be on the lower side.

Figure 7A:
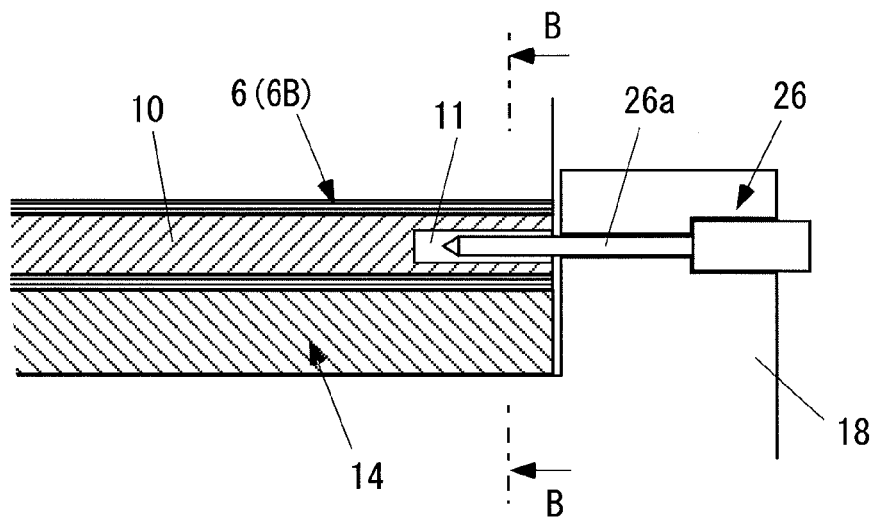
FIG. 7A is a sectional view of a portion A in FIG. 5A.
Figure 7B:
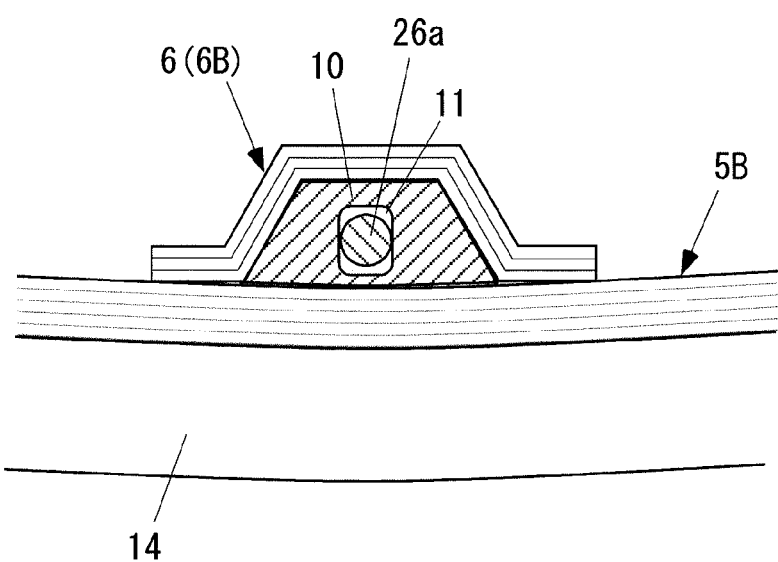
FIG. 7B is a sectional view taken along line B-B in FIG. 7A.

FIG. 7A is a sectional view of a portion A in FIG. 5A, and FIG. 7B is a sectional view taken along line B-B in FIG. 7A.

In FIG. 7A and FIG. 7B, the member positioning mechanism 26 positions the member 6 (the stringers 6B in this example) with respect to the upper mold 16 and the lower mold 18.

In this example, the member positioning mechanism 26 is a positioning mechanism that positions both ends of the mandrel 10.

For example, the member positioning mechanism 26 is fixed to the lower mold 18 facing the central portion (on a center line CL) of lower surface recessed grooves 16b of the upper mold 16.

To be precise, the positioning relative to the lower surface recessed grooves 16b of the upper mold 16 is required, so that the position of the lower mold 18 to which the member positioning mechanism 26 is fixed is the position of the lower mold 18 corresponding to the lower surface recessed grooves 16b of the upper mold 16.

Thus, the positional relationship between the upper mold 16 (the lower surface recessed groove 16b) and the lower mold 18 becomes clear, making it possible to position the mandrel 10 (and the stringers 6B) with respect to the upper mold 16 (the lower surface recessed grooves 16b).

Positioning holes 11 that horizontally extend are provided at both ends of the mandrel 10. The member positioning mechanism 26 has a horizontal rod 26a that can be inserted into the positioning holes 11 of the mandrel 10 and extend in the axial direction. The horizontal rod 26a is horizontally movable and can accurately position and hold the stringer 6B on the inner side of the circular arc part 5B by setting a stringer material on the mandrel 10 in a state in which the horizontal rod 26a has been inserted in the positioning hole 11.

The sectional shape of the positioning hole 11 and the horizontal rod 26a is not limited to the circular shape, and may alternatively be a different shape (e.g., a rectangular shape).

In the case where the circular arc part 5B is pressed with the horizontal rod 26a inserted in the positioning hole 11, the clearance in the vertical direction between the positioning hole 11 and the horizontal rod 26a is desirably set by considering the amount of bulk reduction before and after molding the circular arc part 5B.

With this configuration, the mandrel 10 can be positioned with respect to the upper mold 16 (the lower surface recessed groove 16b) so as to be positioned with respect to the member 6 (the stringers 6B in this example) on the upper surface of the mandrel 10.

The member positioning mechanism 26 may have a different structure insofar as the mandrel 10 and the member 6 (the stringers 6B in this example) can be positioned with respect to the upper mold 16 or the lower mold 18.

The member positioning mechanism 26 described above is a mandrel positioning mechanism provided on the lower mold 18, and accurately positions the mandrel 10 (the stringers 6B) with respect to the upper mold 16. Thus, the position of the mandrel 10 is determined with respect to the circular arc part 5B of the FRP material 2.

Further, by setting a stringer material on the mandrel 10, the stringers 6B can be accurately positioned and held on the inner side of the circular arc part 5B.

After that, the lower surface recessed groove 16b of the upper mold 16 can be accurately placed with respect to the member 6 (the stringer 6B), and then compressed.

The circular arc part 5B and the member 6 (the stringers 6B in this example) are both made of an FRP material, and can be integrally molded (adhered, fixed, or the like) after temporary fixation thereof.

The role of the mandrel 10 is to keep a shape intact when a molding pressure is applied. Therefore, it is preferable to use the mandrel 10 if the member 6 has a hollow structure.

Further, if the member 6 is shaped not to have the hollow structure (e.g., a member having an L-shaped section), then the mandrel 10 can be omitted.

If the mandrel 10 is omitted, then the member positioning mechanism 26 preferably positions the member 6 directly.

The transport device 30 intermittently moves a compressed portion (the press portion 15) of the integrated jig plate 14 obtained by the portion-pressing device 20.

The transport device 30 has a gripping device 32 and a moving device 34.

The gripping device 32 partially grips the integrated jig plate 14. The moving device 34 moves the gripping device 32 in a moving direction X of the integrated jig plate 14.

In this example, the moving direction X of the integrated jig plate 14 is the circumferential direction along the circular arc of the FRP component 3. The moving device 34 is, for example, a multi-joint robot, and the gripping device 32 is a robot hand.

In this example, a pair of the transport devices 30 are provided on the upstream side and the downstream side of the portion-pressing device 20, but the transport device 30 may be provided only on the upstream side or the downstream side.

Further, the gripping device 32 grips an uncompressed portion of the integrated jig plate 14. In this case, for example, a gripped portion may be moved while being compressed by the portion-pressing device 20.

In FIG. 5A and FIG. 5B, the FRP molding system 100 further includes a heating device 40 that heats the upper mold 16 or the lower mold 18. The heating device 40 may heat the upper mold 16 and the lower mold 18.

The heating device 40 has a predetermined temperature distribution with respect to the moving direction X of the integrated jig plate 14.

Figure 8A:
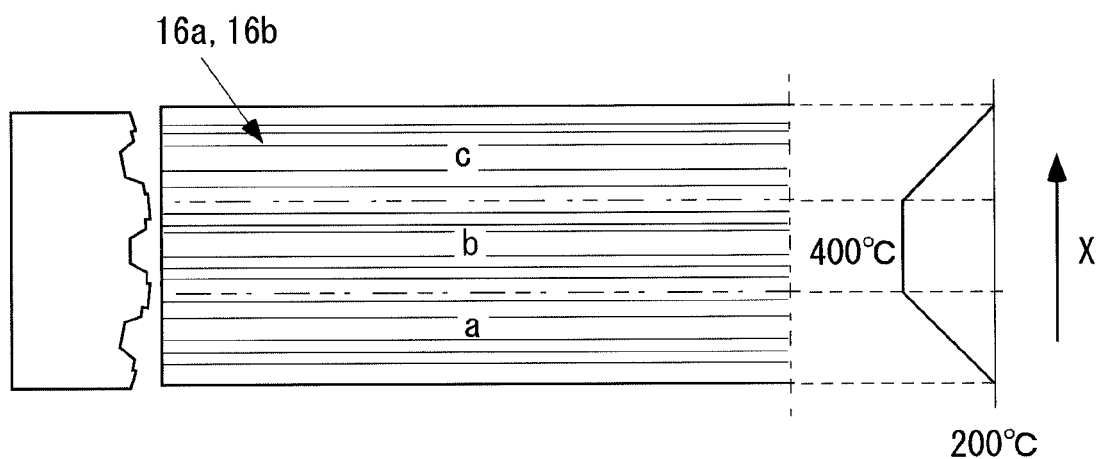
FIG. 8A is an explanatory diagram of the temperature distribution of the upper mold.
Figure 8B:
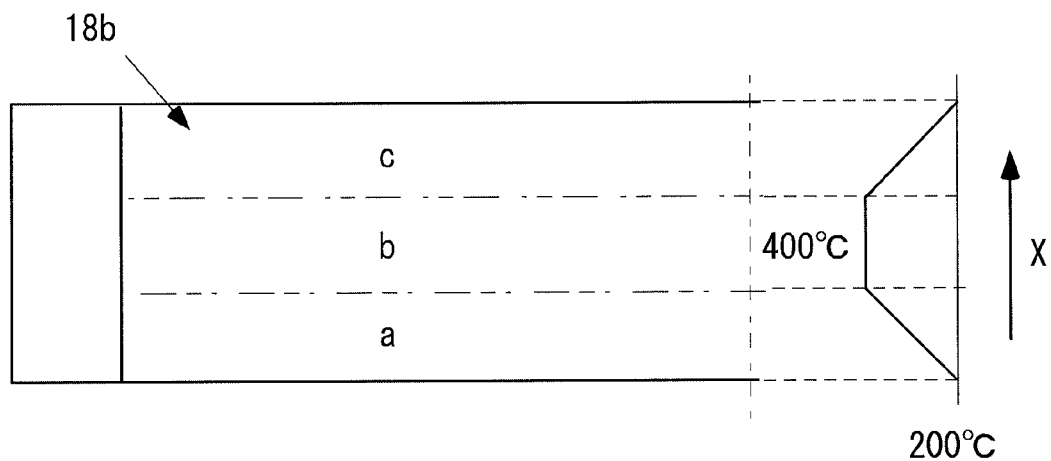
FIG. 8B is an explanatory diagram of the temperature distribution of a lower mold.

FIG. 8A is an explanatory diagram of the temperature distribution of the upper mold 16, and FIG. 8B is an explanatory diagram of the temperature distribution of the lower mold 18.

This example shows a case where the prepregs 1 contain a thermoplastic resin. FIG. 8A illustrates the lower surface circular arc surface 16a and the lower surface recessed groove 16b of the upper mold 16, and FIG. 8B illustrates the upper surface circular arc surface 18b of the lower mold 18. Further, reference signs a, b, and c in the drawings designate a preheating zone, a main molding zone, and a cooling zone, respectively.

In this example, the temperature distribution of the upper mold 16 and the lower mold 18 is equal to or higher than the melting temperature (e.g., 400° C. or higher) at which a thermoplastic resin flows in the central portion of the moving direction X of the integrated jig plate 14 (the main molding zone b). Further, the temperature distribution is equal to or lower than the solidification temperature (e.g., 200° C. to below 400° C.) at which the thermoplastic resin solidifies on the upstream side (the preheating zone a) and the downstream side (the cooling zone c) of the central portion of the moving direction X.

The preheating zone a and the cooling zone c are set to be equal to or lower than the solidification temperature, because if the entire zone is set to the melting temperature or higher, then it will be difficult to uniformly mold the entire FRP component 3. For example, in the case of CFRP, which has high thermal conductivity, an uncompressed portion softens due to heat transfer and, for example, very small bubbles that have been compressed once under pressure expand in the out-of-plane direction, thus making it difficult to perform uniform molding.

Further, the above-mentioned temperature distribution is the temperature distribution at the time of molding the FRP component 3, and preferably, the entire surface of the lower surface circular arc surface 16a or the upper surface circular arc surface 18b is 200° C. or less at the time of transport.

Meanwhile, in the case where the prepreg 1 contains a thermosetting resin, the prepreg 1 is cured while being compressed. Therefore, the temperature distribution is equal to or higher than a curing temperature at which the thermosetting resin is cured in the central portion of the integrated jig plate 14 in the moving direction X (the main molding zone b). The curing temperature of the thermosetting resin is, for example, approximately 180° C. Further, on the upstream side of the central portion in the moving direction X (the preheating zone a), preheating is performed up to a temperature below the curing temperature. Further, in the case of the thermosetting resin, the cooling zone c is unnecessary and can be omitted.

The above-mentioned outer surface jig plate 12 is not essential. If the shape of the mold contact surface side of the FRP component 3 is a simple round shape, then the outer surface jig plate 12 and the inner surface jig plate, which will be described later, are unnecessary.

In this case, the upper mold 16 has the lower surface circular arc surfaces 16a that come in close contact with the circular arc parts 5A and 5B, and the lower surface recessed grooves 16b fitted to the upper surface shapes of the stringers 6A and 6B. The lower mold 18 has the upper surface circular arc surfaces 18b that come in close contact with the outer surface of the FRP component 3.

Further, the above-mentioned integrated jig plate 14 is replaced by the FRP material itself.

A circular arc-shaped inner surface jig plate having an outer surface fitted to the shape of the inner surface of the FRP material 2 may be included.

In this case, the inner surface jig plate has a lower surface circular arc surface that comes in close contact with the circular arc parts 5A and 5B, and a lower surface recessed groove fitted to the shape of the upper surfaces of the stringers 6A and 6B.

In this case, the upper mold side of the inner surface jig plate has a circular arc shape, and the lower surface of the upper mold 16 also has a circular arc shape. In other words, the lower surface of the upper mold 16 does not have to be molded into the lower surface circular arc surfaces 16a or the lower surface recessed grooves 16b.

In addition, a member does not have to be positioned with respect to the upper mold 16 or the lower mold 18.

The same applies when a component (member) is integrally molded on the outer surface of the FRP component 3.

Providing the outer surface jig plate 12 and the inner surface jig plate described above makes it possible for the above-mentioned integrated jig plate 14 to be an integrated component having the FRP material 2 sandwiched between the inner surface jig plate and the outer surface jig plate 12.

By omitting the above-mentioned outer surface jig plate 12 and providing only the inner surface jig plate, the above-mentioned integrated jig plate 14 can be an integrated component having the FRP material 2 held on the outer surface of the inner surface jig plate.

Figure 9:
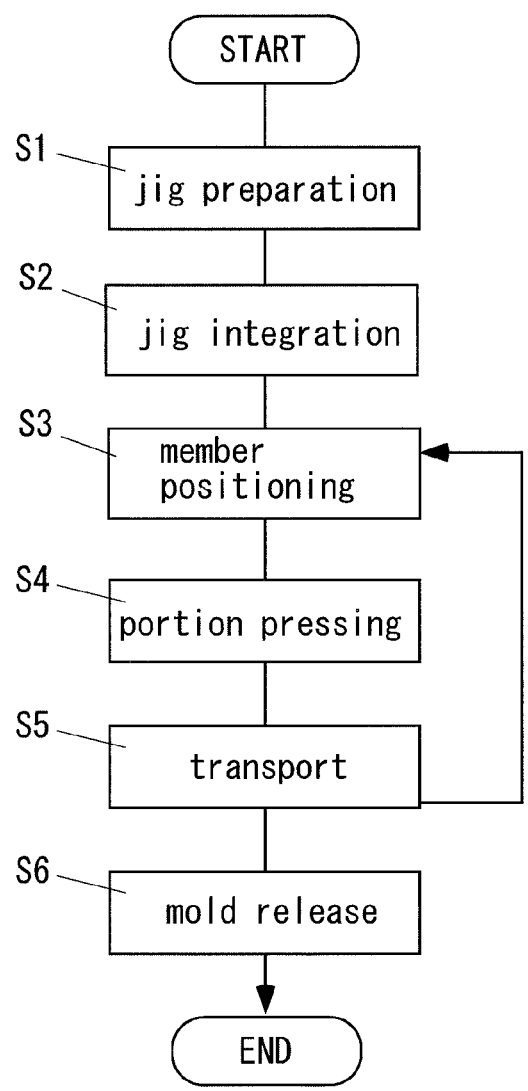
FIG. 9 is an overall flowchart of an FRP molding method in accordance with the present invention.

FIG. 9 is the overall flowchart of the FRP molding method in accordance with the present invention.

The FRP molding method in accordance with the present invention is a method for manufacturing the circular arc-shaped FRP component 3 having a radius of 1 m or more by molding the FRP material 2.

The FRP material 2 is composed of the prepreg 1 of a single layer or a plurality of prepregs 1 that are layered.

In this drawing, the FRP molding method has steps (processes) of S1 to S6.

In the jig preparation step S1, the circular arc-shaped outer surface jig plate 12 having the inner surface 12a fitted to the outer surface shape 3b of the FRP component 3 is prepared.

In the case where the outer surface jig plate 12 is omitted, the step S1 can be omitted.

In the case where the above-mentioned inner surface jig plate is also used, a circular arc-shaped inner surface jig plate having an outer surface fitted to the inner surface shape of the FRP component 3 is also prepared.

In this case, the member positioning step S3 can be omitted.

In the jig integration step S2, the integrated jig plate 14 having the FRP material 2 held on the inner surface 12a of the outer surface jig plate 12 is molded.

In the jig integration step S2, a mold release agent (e.g., a fluorine-based mold release agent) is preferably applied to the inner surface 12a of the outer surface jig plate 12.

According to the present invention, the mandrel positioning and pressing is performed in the following order.

(1) Positioning the mandrel; (2) Setting the stringer material on the mandrel; (3) Pressing; (4) Transport; (5) Positioning the mandrel; (6) Setting the stringer material on the mandrel; and (7) Repeating the above hereinafter.

In other words, according to the present invention, the stringer material (6B) is set each time as described above.

The above is configured to repeat the positioning, the setting, and the pressing, but if the stringer 6B is temporarily fixed to the circular arc part 5B beforehand in such a manner as to match the positional pitch of the lower surface recessed grooves 16b of the upper mold, then it is possible to perform the positioning only once at the beginning.

If the outer surface jig plate 12 is omitted, then the step S2 can be omitted.

If the above-mentioned inner surface jig plate is also used, then the integrated jig plate 14 having the FRP material 2 sandwiched between the inner surface jig plate and the outer surface jig plate 12 is molded.

In this case, the member positioning step S3 can be omitted.

In the member positioning step S3, the member 6 is positioned with respect to the upper mold 16 or the lower mold 18.

For example, if the member 6 is the stringer 6B, the horizontal rods 26a are horizontally inserted into the positioning holes 11 at both ends of the mandrel 10, and a stringer material is set on the mandrel 10 with the horizontal rods 26a inserted in the positioning holes 11, thereby making it possible to accurately position and hold the stringer 6B on the inner side of the circular arc part 5B.

Setting the stringer 6B on the mandrel 10 makes it possible to accurately position and hold the stringer 6B on the inner side of the circular arc part 5B.

For example, the member positioning mechanism 26 is fixed to the lower mold 18 facing the central portion (on the center line CL) of the lower surface recessed groove 16b of the upper mold 16.

To be precise, the positioning relative to the lower surface recessed groove 16b of the upper mold 16 is required, so that the position of the lower mold 18 to which the member positioning mechanism 26 is fixed is the position of the lower mold 18 corresponding to the lower surface recessed groove 16b of the upper mold 16.

Thus, the positional relationship between the upper mold 16 (the lower surface recessed groove 16b) and the lower mold 18 becomes clear, so that the position of the mandrel (the stringer) with respect to the upper mold 16 (the lower surface recessed groove 16b) can be relatively determined.

In a portion pressing step S4, a portion of the integrated jig plate 14 (or the FRP material 2) is intermittently compressed in the radial direction orthogonal to the circular arc part 5B of the FRP material 2 thereby to partially mold the FRP component 3.

In a transport step S5, the compressed portion (the press portion 15) of the integrated jig plate 14 (or the FRP material 2) obtained in the portion pressing step S4 is intermittently moved.

The member positioning step S3, the portion pressing step S4, and the transport step S5 are repeated to compress the entire integrated jig plate 14 so as to mold the entire FRP component 3.

Further, in a mold release step S6, the mandrel 10 and the outer surface jig plate 12 are separated from the integrated jig plate 14 so as to take out the FRP component 3 that has been molded.

In the case where the outer surface jig plate 12 is omitted, only the mandrel 10 is separated from the FRP component 3.

In the case where the inner surface jig plate is also used, the mandrel 10, the outer surface jig plate 12, and the inner surface jig plate are separated from the integrated jig plate 14.

According to the embodiment of the present invention described above, the member 6 (e.g., the stringer 6B) is positioned with respect to the upper mold 16 or the lower mold 18 in the member positioning step S3. Then, in the portion pressing step S4, a portion of the FRP material 2 is sandwiched by the upper mold 16 and the lower mold 18 in the radial direction orthogonal to the circular arc part 5B, and the portion is intermittently compressed (pressed) thereby to partially mold the FRP component 3. Further, in the transport step S5, the compressed portion (the press portion 15) of the FRP material 2 is intermittently moved. Thus, by repeating the portion pressing step S4 and the transport step S5 after the member positioning step S3, the circular arc-shaped FRP component 3 (e.g., a large FRP component having a radius of 1 m or more) which has the member 6 (e.g., the stringers 6A) can be molded and manufactured using a small mold.

Further, in the portion pressing step S4, a portion of the FRP material 2 is compressed (pressed) by the upper mold 16 and the lower mold 18 in the radial direction orthogonal to the circular arc part 5B of the FRP material 2, so that the entire FRP component 3 having the member 6 can be uniformly molded without using a complicated mold.

It is needless to say that the present invention is not limited to the embodiment described above, and a variety of modifications can be added without departing from the gist of the present invention.

For example, in the example described above, the FRP component 3 has the circular arc shape, but the present invention can be applied in the same manner also to a flat-shaped FRP component.

REFERENCE SIGNS LIST a preheating zone; b main molding zone; c cooling zone; CL center line; X moving direction; 1 prepreg; 2 FRP material; 3 FRP component; 3a inner surface shape; 3b outer surface shape; 5A, 5B circular arc part; 6A, 6B stringer; 7a upper surface part; 7b side surface part; 7c leg part; 10 mandrel; 10a upper surface; 10b slope surface; 10c bottom surface; 11 positioning hole; 12 outer surface jig plate; 12a inner surface; 12b outer surface; 14 integrated jig plate; 14a inner surface; 14b outer surface; 15 pressed portion (compressed portion); 16 upper mold; 16a lower surface circular arc surface; 16b lower surface recessed groove; 18 lower mold; 18b upper surface circular arc surface; 20 portion-pressing device; 21 upper bolster; 22 slide; 23 hydraulic ram; 24 press frame; 26 member positioning mechanism; 26a horizontal rod; 30 transport device; 32 gripping device (robot hand); 34 moving device (multi-joint robot); 40 heating device; and 100 FRP molding system.

The invention claimed is:

1. An FRP molding system for manufacturing a circular arc-shaped FRP component by integrally molding an FRP material having a circular arc part of a circular arc shape and a plurality of members having an upper surface shape fixed to the circular arc part, the FRP molding system comprising:
   a portion-pressing device which has an upper mold and a lower mold sandwiching a portion of the FRP material in a radial direction orthogonal to the circular arc part, and which intermittently compresses the portion to partially mold the FRP component;
   a member positioning means which positions each member with respect to the upper mold or the lower mold;
   a transport device configured to intermittently move a compressed portion of the FRP material obtained by the portion-pressing device in a predetermined direction to facilitate the positioning of a next portion of the FRP material to be pressed with a next member by the portion-pressing device.

2. The FRP molding system according to claim 1, wherein the upper mold has a lower surface circular arc surface to be in close contact with the circular arc part, and a lower surface recessed groove fitted to an upper surface shape of the member, and
   the lower mold has an upper surface circular arc surface to be in close contact with an outer surface of the FRP material.

3. The FRP molding system according to claim 1, including:
   a circular arc-shaped outer surface jig plate having an inner surface fitted to an outer surface shape of the FRP member,
   wherein the lower mold has an upper surface circular arc surface to be in close contact with an outer surface of the outer surface jig plate.

4. The FRP molding system according to claim 2,
wherein each member has an upper surface part which sandwiches a detachable mandrel between the upper surface part and the circular arc part and which comes in close contact with an upper surface of the mandrel, a pair of side surface parts that come in close contact with a side surface of the mandrel, and a pair of leg parts that come in contact with an inner surface of the circular arc part extending outward from bottom ends of the side surface parts, and the lower surface recessed groove is to be fitted to the upper surface part, the side surface parts, and the leg parts of the member.

5. The FRP molding system according to claim 4, wherein the mandrel has an integrated structure having a draft angle with respect to the member or a split structure.

6. The FRP molding system according to claim 1, wherein the member is a plurality of stringers extending in parallel to each other in an axial direction.

7. The FRP molding system according to claim 1, including:
a heating device that heats the upper mold or the lower mold,
wherein the heating device has a predetermined temperature distribution with respect to a moving direction of the FRP material.

8. The FRP molding system according to claim 7,
wherein the FRP material is a prepreg containing a thermoplastic resin, and
the temperature distribution is equal to or higher than a melting temperature at which the thermoplastic resin flows in a central portion in the moving direction, and is equal to or lower than a solidification temperature at which the thermoplastic resin solidifies on an upstream side and a downstream side of the central portion.

9. The FRP molding system according to claim 7,
wherein the FRP material is a prepreg containing a thermosetting resin, and
the temperature distribution is equal to or higher than a curing temperature at which the thermosetting resin is cured in a central portion in the moving direction.

10. The FRP molding system according to claim 1,
wherein the transport device has:
a gripping device that partially grips the FRP material; and
a moving device that moves the gripping device in a moving direction of the FRP component.

11. An FRP molding method for manufacturing the circular arc-shaped FRP component using the FRP molding system of claim 1, the FRP molding method comprising:
a member positioning step of positioning each member with respect to the upper mold or the lower mold;
a portion pressing step of sandwiching a portion of the FRP material by the upper mold and the lower mold in a radial direction orthogonal to the circular arc part and by intermittently compressing the portion so as to partially integrally mold the FRP component; and
a transport step of intermittently moving a compressed portion of the FRP material obtained by the portion pressing step,
wherein the portion pressing step and the transport step are repeated.

* * * * *